United States Patent
So et al.

(10) Patent No.: US 7,526,679 B2
(45) Date of Patent: Apr. 28, 2009

(54) APPARATUS FOR DEVELOPING AND VERIFYING SYSTEM-ON-CHIP FOR INTERNET PHONE

(75) Inventors: Woon-Seob So, Daejon (KR);
Do-Young Kim, Daejon (KR);
Young-Sun Kim, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 546 days.

(21) Appl. No.: 11/183,673

(22) Filed: Jul. 18, 2005

(65) Prior Publication Data
US 2006/0143526 A1      Jun. 29, 2006

(30) Foreign Application Priority Data
Dec. 14, 2004    (KR) ............... 10-2004-0105802

(51) Int. Cl.
*G06F 11/00*    (2006.01)
(52) U.S. Cl. ............... 714/31; 714/30; 716/16
(58) Field of Classification Search ............... None
See application file for complete search history.

(56) References Cited

U.S. PATENT DOCUMENTS

| 6,449,269 | B1 | | 9/2002 | Edholm | |
|---|---|---|---|---|---|
| 7,296,186 | B2 | * | 11/2007 | So et al. ............... | 714/30 |
| 2003/0041129 | A1 | * | 2/2003 | Appleby-Allis ............... | 709/221 |
| 2003/0066057 | A1 | * | 4/2003 | RuDusky ............... | 717/140 |
| 2003/0110306 | A1 | | 6/2003 | Bailis et al. | |
| 2003/0112830 | A1 | * | 6/2003 | So et al. ............... | 370/524 |
| 2003/0163798 | A1 | * | 8/2003 | Hwang et al. ............... | 716/16 |
| 2004/0090949 | A1 | * | 5/2004 | So et al. ............... | 370/352 |
| 2005/0138582 | A1 | * | 6/2005 | So et al. ............... | 716/4 |

FOREIGN PATENT DOCUMENTS

| KR | 2001 0067370 | 7/2001 |
|---|---|---|
| KR | 2002 0042107 | 6/2002 |
| KR | 2003 0002277 | 1/2003 |
| KR | 2003 0025057 | 3/2003 |
| KR | 10-2004 0003087 | 1/2004 |
| KR | 10-2004 0076708 | 9/2004 |

OTHER PUBLICATIONS

'The VoIP System on Chip Design and Test Board Development for the Function Verification' So et al., Proceedings of 2003 Fall Korean Institute of Maritime Information and Communication Sciences Conference, vol. 7, No. 2, Dec. 2003, pp. 990-994.

* cited by examiner

*Primary Examiner*—Christopher S McCarthy
(74) *Attorney, Agent, or Firm*—Ladas & Parry LLP

(57) ABSTRACT

Provided is an apparatus for developing and verifying a system-on-chip for an Internet phone. The object of the present invention is to provide the system-on-chip developing and verifying apparatus for the Internet phone, which can develop and verify the system-on-chip simultaneously by integrating an Advanced RISC Machine(ARM) core module, a field programmable gate array (FPGA), a peripheral interface and the system-on-chip. The apparatus includes an ARM core module performing a core processor function, a peripheral interface including a memory and many external input/output devices, a FPGA controlling the ARM core module and performing a control function for connecting the ARM core module and the peripheral interface, and a system-on-chip integrating the functions of the ARM core module and the FPGA.

20 Claims, 5 Drawing Sheets

APPARATUS FOR DEVELOPING AND VERIFYING SYSTEM-ON-CHIP FOR INTERNET PHONE

FIELD OF THE INVENTION

The present invention relates to an apparatus for developing and verifying a system-on-chip for an Internet phone; and more particularly, to an apparatus for developing and verifying a system-on-chip for the Internet phone integrating a core module, a field programmable gate array (FPGA), a peripheral interface and the system-on-chip.

DESCRIPTION OF RELATED ART

Generally, when a system-on-chip is developed, a development system for developing a system-on-chip function is manufactured by using a core processor, a field programmable gate array (FPGA), and a peripheral interface. If the system-on-chip is developed finally through the development device, the developer manufactures a verification device for verifying a chip additionally and verifies a developed system-on-chip.

Therefore, a development system for developing the function of the system-on-chip and the verification system for verifying a finally developed system-on-chip are required to develop the system-on-chip for the Internet phone. Also, in case of developing a system-on-chip for a wired or wireless Internet phone, the development system for developing the function of the system-on-chip needs to be formed separately and used limitedly.

Thus, since the development and verification system for developing the system-on-chip for the Internet phone are manufactured separately, the differences are caused between designing and embodying the development system and the verification system, which make it difficult to debug the developed system-on-chip for the Internet phone and cause problems that unnecessary functions are added to the development system and the verification system.

Therefore, the development system and the verification system need to be designed and manufactured separately to develop the system-on-chip for the Internet phone, which causes a problem of high cost. Also, as described in the above, since there are differences between designing and embodying the development system and the verification system, it takes much time to debug the developed system-on-chip for the Internet phone.

SUMMARY OF THE INVENTION

It is, therefore, an object of the present invention to provide an apparatus for developing and verifying a system-on-chip for an Internet phone that can develop and verify the system-on-chip simultaneously by integrating an Advanced RISC Machine(ARM) core module performing a minimum core processor function, a field programmable gate array (FPGA), the peripheral interface and the system-on-chip.

Other objects and aspects of the invention will be understood by the following description and become more apparent from the embodiments in accordance with the present invention, which is set forth hereinafter. It will be also apparent that objects and aspects of the invention can be embodied easily by the means and combinations thereof defined in the claims.

In accordance with an aspect of the present invention, there is provided an apparatus for developing and verifying a system-on-chip for an Internet phone, which includes: an ARM core module for performing a core processor function; a peripheral interface including memories and various external input/output devices; a FPGA for controlling the ARM core module and performing a control function for connecting the ARM core module and the peripheral interface; and a system-on-chip integrating the functions of the ARM core module and the FPGA.

Other objects and aspects of the invention will become apparent from the following description of the embodiments with reference to the accompanying drawings. Therefore, those skilled in the art that the present invention is included can embody the technological concept and scope of the invention easily. In addition, if it is considered that detailed description on the prior art may blur? the point of the present invention, the detailed description will not be provided herein.

Before description, it is clarified that the present invention can be used to develop and verify various system-on-chips as well as the system-on-chip for a wired/wireless Internet. For example, if a video signal processing device is added to the system-on-chip developing and verifying apparatus for the Internet phone in accordance with the present invention, the apparatus can be used to develop and verify a system-on-chip having an Internet video phone function. Also, it can be used to develop a wireless access point.

BRIEF DESCRIPTION OF THE INVENTION

The above and other objects and features of the present invention will become apparent from the following description of the preferred embodiments given in conjunction with the accompanying drawings, in which.

Figure 1:
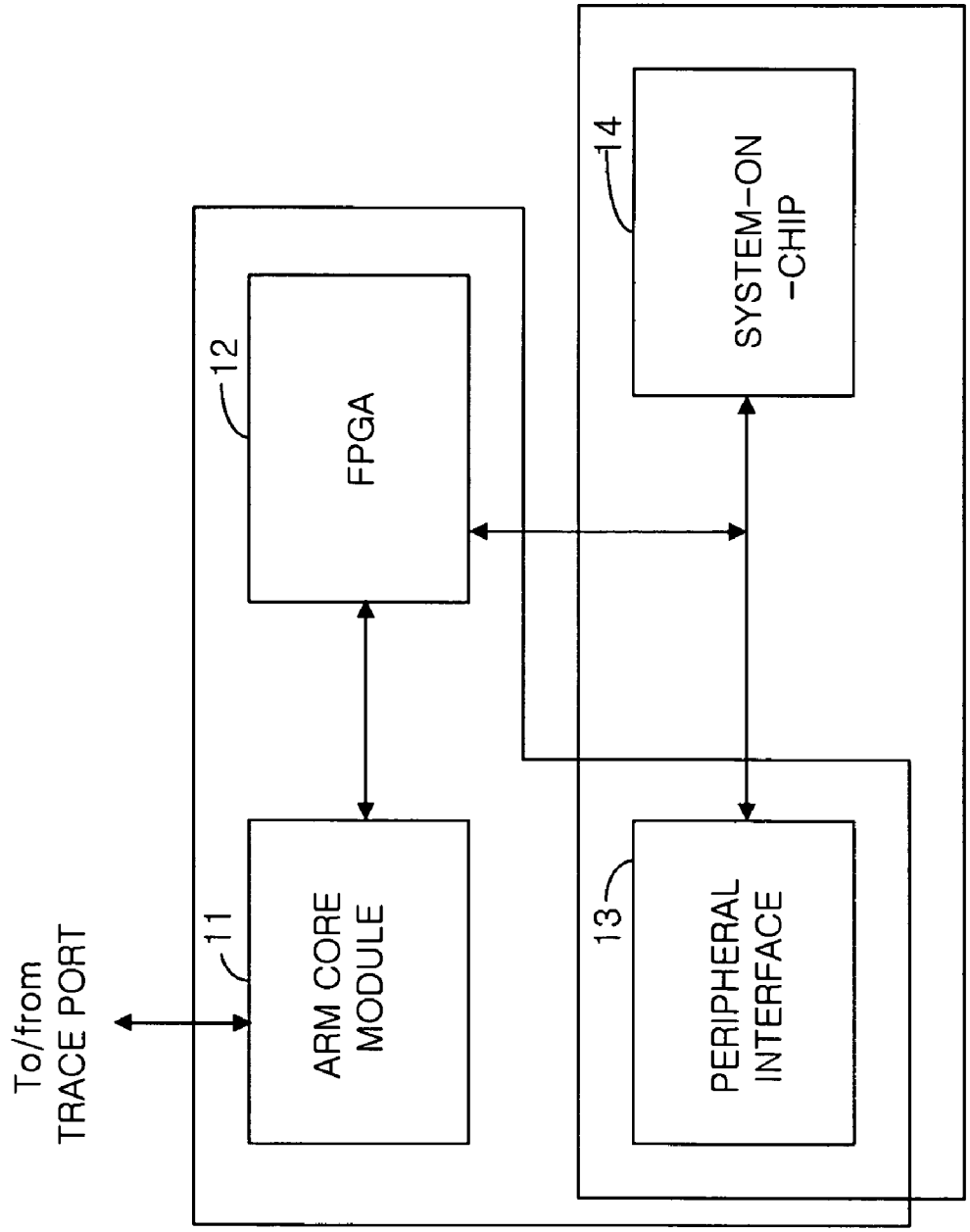
FIG. 1 is a block diagram showing an apparatus for developing and verifying a system-on-chip for an Internet phone in accordance with an embodiment of the present invention.
Figure 4:
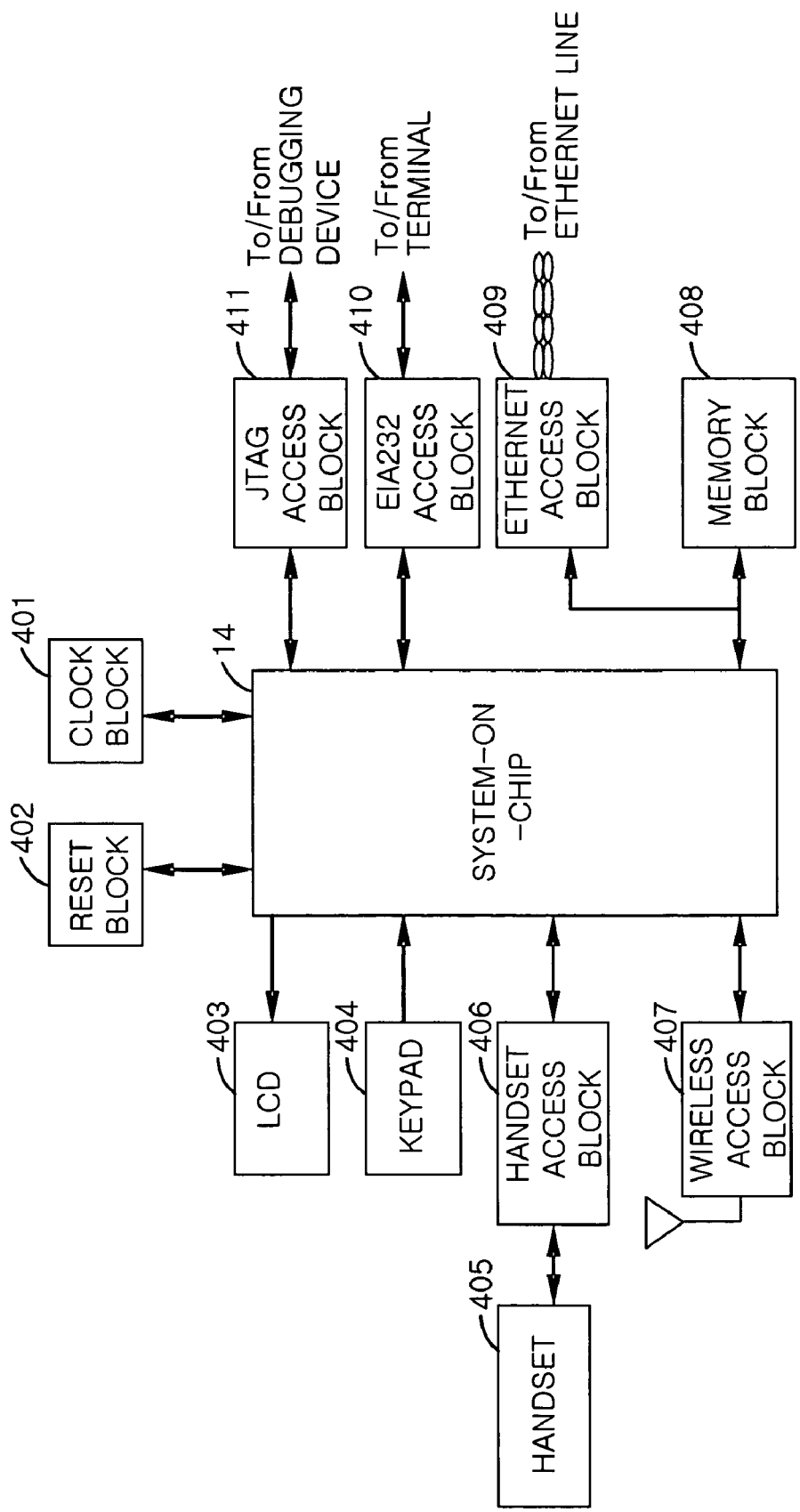
Figure 5:
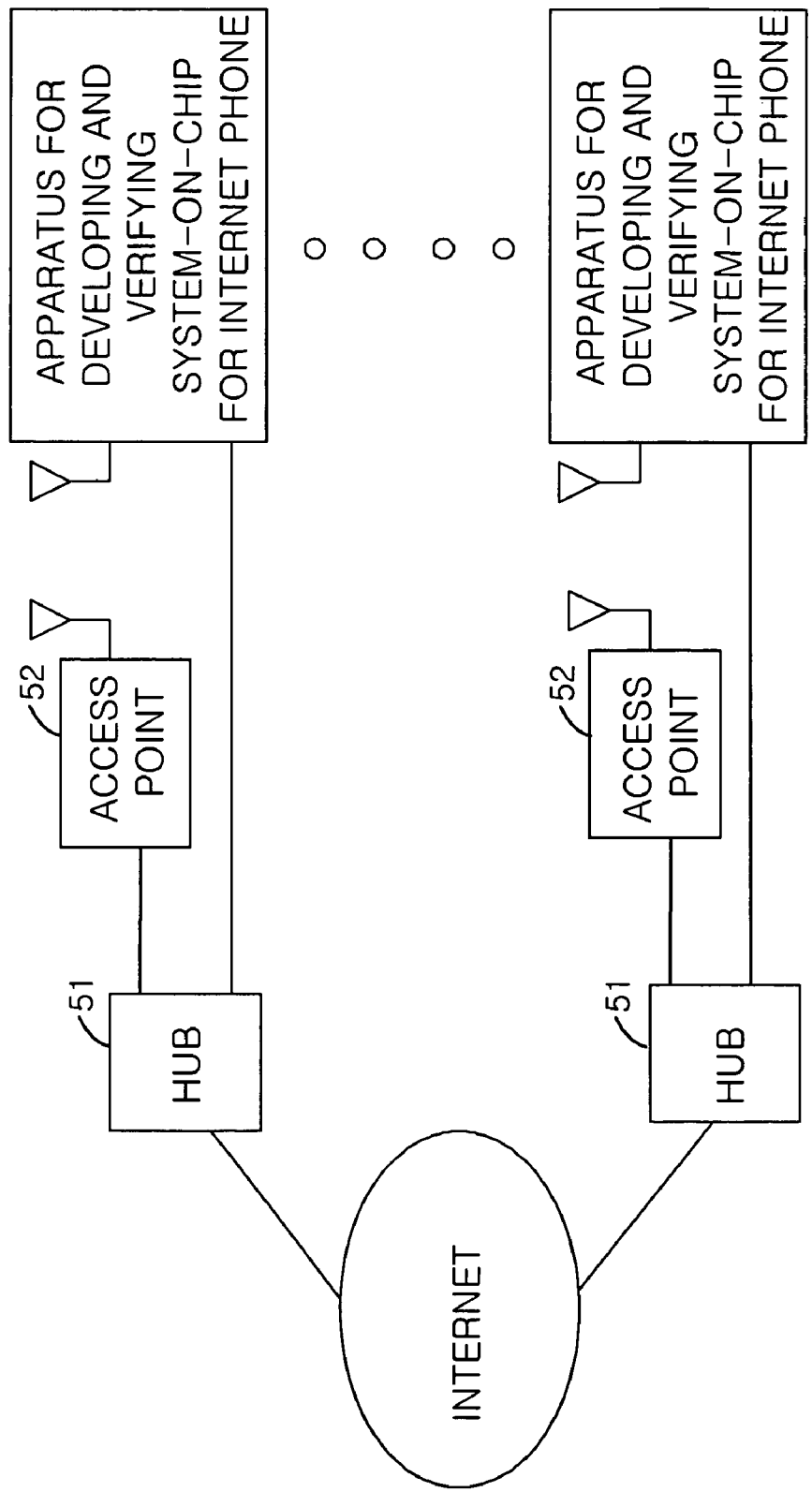

FIG. 4 is a block diagram showing a peripheral interface connected to the system-on-chip of FIG. 1 in accordance with an embodiment of the present invention; and FIG. 5 is a block diagram illustrating a procedure of developing and verifying the system-on-chip by using the system-on-chip developing and verifying apparatus for the Internet phone in accordance with an embodiment of the present invention.

DETAILED DESCRIPTION OF THE INVENTION

Other objects and aspects of the invention will become apparent from the following description of the embodiments with reference to the accompanying drawings, which is set forth hereinafter.

FIG. 1 is a block diagram showing an apparatus for developing and verifying a system-on-chip for an Internet phone in accordance with an embodiment of the present invention.

As shown in FIG. 1, the apparatus for developing and verifying the system-on-chip for an Internet phone includes an Advanced RISC Machine(ARM) core module 11, a field programmable gate array (FPGA) 12, a peripheral interface 13, and a system-on-chip 14.

The ARM core module 11 is formed of a test chip to perform only the minimum core processor function.

The FPGA 12 controls the ARM core module 11 and performs diverse control functions for connecting it to a peripheral interface 13.

The peripheral interface 13 includes a memory and diverse external input/output devices.

The system-on-chip 14 integrates and embodies the function of the ARM core module 11 and the FPGA 12 into one chip.

The system-on-chip 14 is developed by using the ARM core module 11, the FPGA 12 and the peripheral interface 13, and the developed system-on-chip 14 is verified by using the peripheral interface 13 used when developed.

For example, as shown in FIG. 1, the system-on-chip developing and verifying apparatus in accordance with the present invention performs debugging by putting the code used in a chip designing again on the FPGA and testing it in order to find defective part in the manufactured chip. Then, it is possible to find the defective part easily and check information required for the adjustment of the chip. Since the peripheral interface used in the designing step of the chip can be used again after the manufacturing of the chip, the chip can be tested and debugged safely.

Each element of FIG. 1 will be described in detail hereinafter referring to FIGS. 2 to 4.

Figure 2:
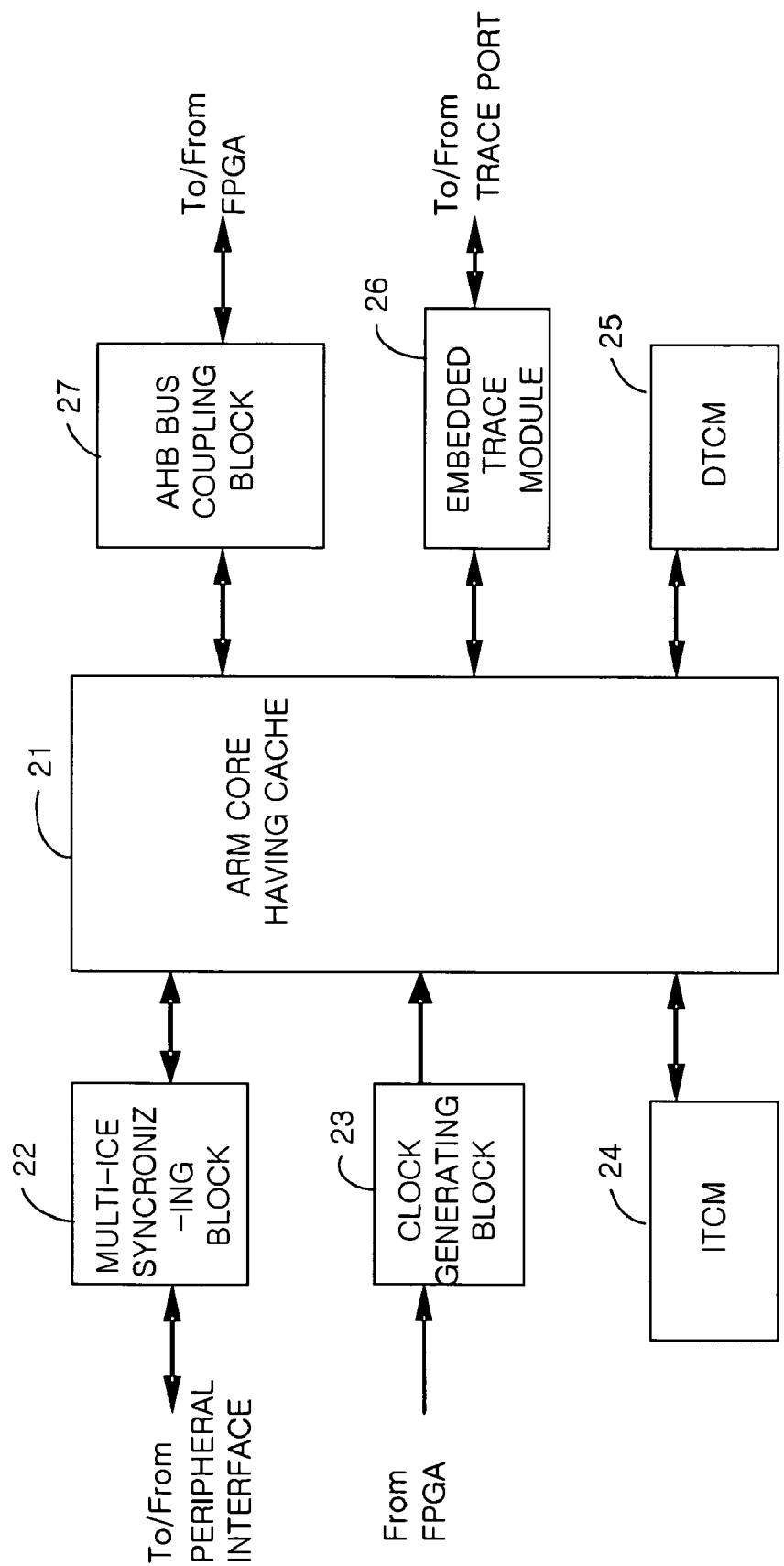
FIG. 2 is a block diagram illustrating an Advanced RISC Machine(ARM) core module of FIG. 1 in accordance with an embodiment of the present invention.

FIG. 2 is a block diagram illustrating an Advanced RISC Machine(ARM) core module of FIG. 1 in accordance with an embodiment of the present invention.

As shown in FIG. 2, the ARM core module 11 of FIG. 1 includes an ARM core 21 having a cache, a Multi-ICE synchronizing block 22, a clock generating block 23, an instruction tightly coupled memory (ITCM) 24, a data tightly coupled memory (DTCM) 25, an embedded trace module (ETM) 26 and an advanced high-performance bus(AHB) coupling block 27.

When the ARM core 21 having the cache is connected to a debugging device, i.e., a Multi-ICE, through a joint test action group (JTAG), the Multi-ICE synchronizing block 22 synchronizes a clock and data between the ARM core 21 having the cache and the debugging device.

The clock generating block 23 multiplies or demultiplies the clock required in the function of the ARM core 21 having the cache by using the reference clock which is inputted from the outside. For example, in case that the clock generating block 23 is ARM926EJ-S, the ARM926EJ-S receives a reference clock of 24 MHz from the outside, and multiplies or devides a clock of 18 MHz to 200 MHz.

The ITCM 24 stores codes for instruction and the DTCM 25 stores codes for data.

The ETM 26 is a module for tracing the process state of the ARM core 21 having the cache and it is connected to an external trace port.

Also, the AHB coupling block 27 is connected to the outside after binding a plurality of AHBs.

Figure 3:
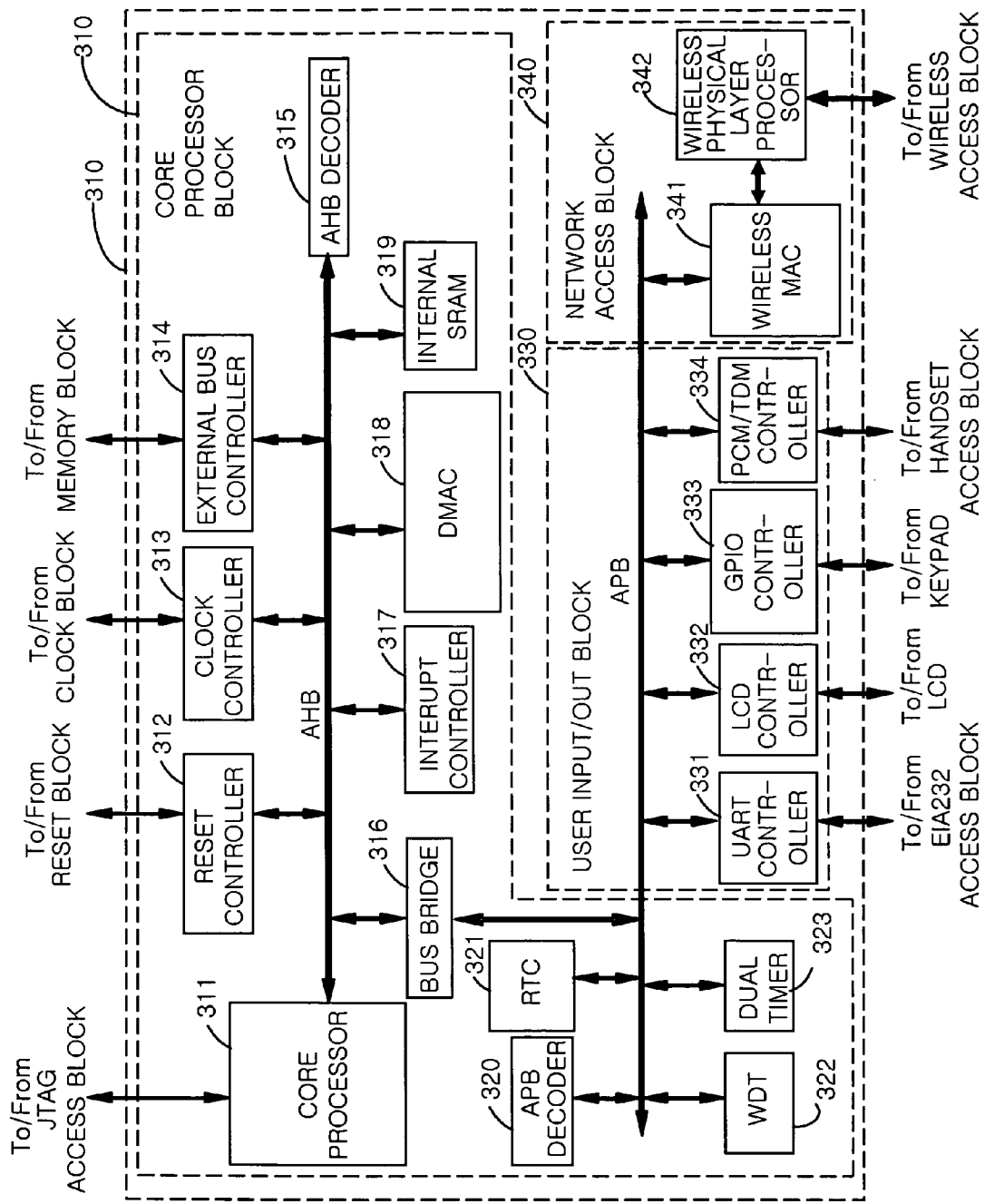
FIG. 3 is a block diagram illustrating a system-on-chip of FIG. 1 in accordance with an embodiment of the present invention.

FIG. 3 is a detailed block diagram of the system-on-chip of FIG. 1 in accordance with an embodiment of the present invention.

As shown in FIG. 3, the system-on-chip 14 includes a core processor block 310 performing a function of a central processing unit, a user input/output block 330 for connection with diverse external input/output devices, and a network accessing block 340 for connection with the external network.

The core processor block 310 includes a core processor 311 connected to the AHB, a reset controller 312, a clock controller 313, an external bus controller 314, an AHB decoder 315, a bus bridge 316, an interrupt controller 317, a direct memory access controller (DMAC) 318, an internal static random access memory (SARM) 319, an advanced peripheral bus (APB) decoder 320 connected to the APB, a real-time clock (RTC) 321, a watch dog timer (WDT) 322 and a dual timer 323.

The reset controller 312 connected to the external reset block initializes all controllers according to the reset signal inputted from the external reset block, generates the reset signal required in each controller and provides the signal to the AHB.

The clock controller 313 connected to the external clock block receives the clock signals of 40 MHz and 4.096 MHz from the external clock block and generates various clocks required in the internal through a phase lock loop.

The external bus controller 314 generates a control signal for reading memory data or writing data in the memory according to the timing in order to access to a flash memory, a dynamic memory and a device of a form of a memory map which are connected to the outside.

The AHB decoder 315 decodes the access area connected to the AHB.

The core processor 311 performs a central processing unit function as an RISC micro processor having a process capacity of 32 bit.

The bus bridge 316 connects a data signal, an address signal and a control signal to meet the timing of each bus between an AHB and an APB.

The interrupt controller 317 processes the internal and external interrupt generated in the program process, and the direct access memory controller 318 generates and provides the required control signal in order to transmit and receive the data between each controller and the memory fast without interrupt of the processor.

The internal SRAM 319 stores temporarily the program and the data to which the core processor 311 can access fast.

The APB decoder 320 decodes the access area of each controller connected to the APB.

The RTC 321 counts minute, time, day, month and year by counting as a second unit of the clock standard.

The WDT 322 generates the interrupt as a regular cycle to watch the program performing procedure.

The dual timer 323 is provided with two timers, receives the standard clock and generates the proper timing signal in the time designated in the program.

Meanwhile, the user input/output block 330 includes a universal asynchronous receiver/transmitter (UART) controller 331, a liquid crystal display (LCD) controller 332, a general purpose input/output (GPIO) controller 333 and a pulse code modulation/time division multiplexing (PCM/TDM) controller 334.

The UART controller 331 controls the data inputted/outputted at a speed of 230.4 kbps for an EIA232 communication and processes the data so as to meet the UART protocol.

The LCD controller 332 controls the LCD data and the clock signal to output information to the LCD connected to the external.

The GPIO controller 333 processes the input/output signal used as diverse control signals. For example, keypad data and a light emitting diode (LED) drive signal are connected.

The PCM/TDM controller 334 receives/transmits the PCM data with the external handset access block, or the TDM data with the TDM bus device.

Meanwhile, the network access block 340 includes a wireless media access controller (MAC) 341 connected to the APB and a wireless physical layer processor (PHY) 342 connected to the wireless media access controller 341.

The wireless media access controller 341 processes wireless multiple analog components function protocol for wireless LAN access.

The physical layer processor 342 is connected directly to the wireless media access controller 341 and performs an orthogonal frequency division multiplexing (OFDM) modem function following the standard of the Institute of Electrical and Electronics Engineers (IEEE) 802.g. It can support the standards such as IEEE 802.a and IEEE 802.b if necessary.

FIG. 4 is a block diagram showing a peripheral interface connected to the system-on-chip of FIG. 1 in accordance with an embodiment of the present invention.

As shown in FIG. 4, the peripheral interface 13 connected to the system-on-chip includes a clock block 401, a reset block 402, a liquid crystal display (LCD) 403, a keypad 404, a handset 405, a handset access block 406, a wireless access block 407, a memory block 408, an Ethernet access block 409, an EIA232 access block 410 and a JTAG access block 411.

The clock block 401 provides clocks of 40 MHz and 4.096 MHz required in the system-on-chip 14, and the clock inputted to the clock controller 313 of the system-on-chip 14 is provided to each block after devided and multiplied.

The reset block 402 provides the power input reset signal and a switch reset signal to the system-on-chip 14 for the required time.

The LCD 403 receives data signals, a data enable signal, a reading/writing control signal, a data/control classification signal, a chip selective signal, and a reset signal from the system-on-chip 14 and displays messages required for all conditions and a user of the terminal. Herein, the displayed message can be a hook on-off condition of the phone, a calling/called phone number and a present time. Also various messages can be added and deleted by programming the core processor 311.

The keypad 404 is provided with twelve basic key buttons for dialing a special number as well as a phone number and eight secondary function key buttons for additional services.

The handset 405 connected to the handset access block 406 performs a handset function, and the handset access block 406 performs a mutual transform function between a digital and an analog signal of various tone and speech signals, and an amplification function. Also, the handset access block 406 connected to a microphone and a speaker functions as a speaker phone.

Also, the handset access block 406 is connected to the PCM/TDM controller 334, the PCM bus or the TDM bus, and performs a mutual communication through a transmitting/receiving clock signal, a frame synchronization signal, a transmitting data signal and a receiving data signal.

The wireless access block 407 accesses to the wireless network through a wireless frequency of 2.4 GHz or 5 GHz band, transforms the analog signal received from the wireless network into a digital data of 10 bits and outputs the data to the wireless physical layer processor 342. Also, the wireless access block 407 transforms the digital data of 10 bits outputted from the wireless physical layer processor 342 into an analog signal and outputs as a transmitting process wireless signal.

The memory block 408 is connected to the external bus controller 314 of the system-on-chip 14 directly and stores a start program or a terminal operating program. Meanwhile, the memory block 408 can include a flash read only memory (FROM) and a dynamic random access memory (DRAM). The FROM can access as 8, 16 and 32-bit buses. The DRAM can store user data or various application programs temporarily and access as 8, 16 and 32-bit buses. Also, the external device possible to access in a form of a memory map can be connected as a memory block 408, and in the present embodiment the external Ethernet device can be connected through an Ethernet access block 409.

The Ethernet access block 409 that the device is connected to the external local bus in the form of the memory map performs as an Ethernet media access controller and an Ethernet physical layer function. Herein, the Ethernet access block 409 is connected to the system-on-chip 14 through address signals, data signals, a chip select signal, a data reading signal, a data writing signal, an interrupt signal, byte enable signals, a data clock signal and a reset signal.

The EIA232 access block 410 connected to the terminal for debugging through an EIA232 port includes a signal level driver and a receiver in the internal and is connected to the terminal through a transmitting data signal, a receiving data signal, a transmitting requirement signal and a receiving ready signal.

The JTAG access block 411 is connected to the core processor 311 of the system-on-chip 14 and communicates mutually through an input data signal, an output data signal, a data clock signal and a reset signal. Also, the JTAG access block 411 can be connected to the Multi-ICE or a RealView device to debug a software program operating in the core processor 14.

FIG. 5 is a block diagram illustrating a procedure of developing and verifying the system-on-chip for the Internet phone by using the system-on-chip developing and verifying apparatus for the Internet phone in accordance with an embodiment of the present invention.

As shown in FIG. 5, when embodying a wireless Internet phone, the system-on-chip developing and verifying apparatus for the Internet phone connects an Internet by accessing to an access point 52 through a wireless access block 407, and when embodying a wired Internet phone, the apparatus connects an Internet by accessing to a hub 51 through an Ethernet access block 409 and testing the system-on-chip for the Internet phone in real-time, which makes it possible to test all functions of the system-on-chip before and after the generation of the system-on-chip.

The present invention can easily perform debugging, cut down on expenses and develop/verify a reliable chip.

Also, the present invention can be used in developing various system-on-chips by loading the software of various protocols additionally.

Also, the present invention provides an environment that can design, develop a superior chip and verifying the function of the chip.

The present application contains object matter related to Korean patent application No. 2004-0105802, filed with the Korean Intellectual Property Office on Dec. 14, 2004, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus for developing and verifying a system-on-chip for an Internet phone, comprising:
    an Advanced RISC Machine (ARM) core module for performing a function of a core processor;
    a peripheral interface including a memory and many external input/output devices;
    a field programmable gate array (FPGA) for controlling the ARM core module and performing a control function for connecting the ARM core module and the peripheral interface; and the system-on-chip developed using the ARM core module, the peripheral interface, and the FPGA integrating and embodying the functions of the ARM core module and the FPGA independent of both the ARM core module and the FPGA.

2. The apparatus as recited in claim 1, wherein the peripheral interface includes:
a reset block for providing a reset signal to the system-on-chip;
a clock block for providing a clock signal to the system-on-chip;
a memory block connected to the system-on-chip and storing a starting program; a terminal operating program, a user data and various application programs;
an accessing means including a joint test action group (JTAG) access block for supporting the connection of the system-on-chip and an external debugging device for debugging the software program of the system-on-chip, and supporting a handset access block, a wired/wireless network and an EIA232 access.

3. The apparatus as recited in claim 2, wherein the JTAG access block connects the system-on-chip and the external debugging device through an input data signal, an output data signal, a data clock signal and a reset signal.

4. The apparatus as recited in claim 1, wherein the ARM core module includes:
an ARM core having a cache;
a synchronizing block for synchronizing the clock and the data with the external debugging device through the peripheral interface;
a clock generating block for providing the clock required in the ARM core function by using an inputted reference clock through the field programmable gate array;
an embedded trace module for tracing the operating situation of the ARM core by being connected to an external trace port;
an AHB coupling block for connecting to the external by binding a plurality of advanced host buses (AHB) and connecting the AHB to the outside; and
a memory block for storing codes for an instruction and data.

5. The apparatus as recited in claim 1, wherein the system-on-chip includes:
a core processor block for controlling the system-on-chip and performing a central processing;
a user input/output block for controlling an external user access block; and
a network access block for accessing to a wireless network.

6. The apparatus as recited in claim 5, wherein the core processor block includes:
a risc core performing a central processing and having a processing capacity of 32 bits;
an advanced host bus (AHB) decoder for decoding the access area of each controller connected to an advanced host bus (AHB);
an advanced peripheral bus (APB) decoder for decoding the access area of each controller connected to the advanced peripheral bus (APB);
a memory for temporarily storing a program and data to which the risc core can access fast;
a real-time clock being connected to the APB for calculating minute, time, day, month and year, counting as a second unit according to the standard of the 1 Hz clock;
a watch timer connected to the APB for generating an interrupt at a regular interval to watch the program performing procedure;
a dual timer having two timers and connected to the APB for generating a timing signal at a time designated in the program based on the reference clock.

7. The apparatus as recited in claim 6, wherein the user input/output block includes:
a universal asynchronous transceiver controller for controlling inputted/outputted data for the EIA232 communication and processing the data according to the universal asynchronous receiver transmitter (UART) protocol;
a display device controller for controlling data and a clock signal for outputting information to an external display device;
an input/output controller for processing a keypad data input signal and a light emitting diode drive signal; and
a PCM/TDM controller for transmitting/receiving pulse code modulation (PCM) data with an external handset access block and time division multiplexing (TDM) data with an external device having a TDM bus interface.

8. The apparatus as recited in claim 7, wherein the network access block includes:
a wireless media access controller processing a media access control protocol for the wireless local area network (LAN) access; and
a wireless physical processor connected to the wireless media access controller for performing an orthogonal frequency division multiplexing modem function.

9. An apparatus for developing and verifying a system-on-chip for an Internet phone, comprising:
an Advanced RISC Machine (ARM) core module for performing a function of a core processor, the ARM core module comprising:
an ARM core having a cache;
a synchronizing block for synchronizing a clock and a data with an external debugging device through the peripheral interface;
a clock generating block for providing the clock required in an ARM core function by using an inputted reference clock through the field programmable gate array;
an embedded trace module for tracing an operating situation of the ARM core by being connected to an external trace port;
an AHB coupling block for connecting to the external by binding a plurality of advanced host buses (AHB) and connecting the AHB to the outside; and
a memory block for storing codes tar an instruction and data;
a peripheral interface including a memory and many external input/output devices;
a field programmable gate array (FPGA) for controlling the ARM core module and performing a control function for connecting the ARM core module and the peripheral interface; and
the system-on-chip integrating the functions of the ARM core module and the FPGA.

10. The apparatus as recited in claim 9, wherein the peripheral interface includes:
a reset block for providing a reset signal to the system-on-chip;
a clock block for providing a clock signal to the system-on-chip;
a memory block connected to the system-on-chip and storing a starting program, a terminal operating program, a user data and various application programs;
an accessing means including a joint test action group (JTAG) access block for supporting a connection of the system-on-chip and an external debugging device for debugging a software program of the system-on-chip, and supporting a handset access block, a wired/wireless network and an EIA232 access.

11. The apparatus as recited in claim 10, wherein the JTAG access block connects the system-on-chip and the external debugging device through an input data signal, an output data signal, a data clock signal and a reset signal.

12. The apparatus as recited in claim 9, wherein the system-on-chip includes:
    a core processor block for controlling the system-on-chip and performing a central processing;
    a user input/output block for controlling an external user access block; and
    a network access block for accessing to a wireless network.

13. The apparatus as recited in claim 12, wherein the core processor block includes:
    a risc core performing a central processing and having a processing capacity of 32 bits;
    an advanced host bus (AHB) decoder for decoding an access area of each controller connected to an advanced host bus (AHB);
    an advanced peripheral bus (APB) decoder for decoding an access area of each controller connected to an advanced peripheral bus (APB);
    a memory for temporarily storing a program and data to which the risc core can access fast;
    a real-time clock being connected to the APB for calculating minute, time, day, month and year, counting as a second unit according to the standard of the 1 Hz clock;
    a watch timer connected to the APB for generating an interrupt at a regular interval to watch a program performing procedure;
    a dual timer having two timers and connected to the APB for generating a timing signal at a time designated in the program based on the reference clock.

14. The apparatus as recited in claim 13, wherein the user input/output block includes:
    a universal asynchronous transceiver controller for controlling inputted/outputted data for the EIA232 communication and processing the data according to the universal asynchronous receiver transmitter (UART) protocol;
    a display device controller for controlling data and a clock signal for outputting information to an external display device;
    an input/output controller for processing a keypad data input signal and a light emitting diode drive signal; and
    a PCM/TDM controller for transmitting/receiving pulse code modulation (PCM) data with an external handset access block and time division multiplexing (TDM) data with an external device having a TDM bus interface.

15. The apparatus as recited in claim 14, wherein the network access block includes:
    a wireless media access controller processing a media access control protocol for the wireless local area network (LAN) access; and
    a wireless physical processor connected to the wireless media access controller for performing an orthogonal frequency division multiplexing modem function.

16. An apparatus for developing and verifying a system-on-chip for an Internet phone, comprising:
    an Advanced RISC Machine (ARM) core module for performing a function of a core processor;
    a peripheral interface including a memory and many external input/output devices, the peripheral interface comprising:
        a reset block for providing a reset signal to the system-on-chip;
        a clock block for providing a clock signal to the system-on-chip;
        a memory block connected to the system-on-chip and storing a starting program, a terminal operating program, a user data and various application programs;
        an accessing means including a joint test action group (JTAG) access block for supporting the connection of the system-on-chip and an external debugging device for debugging the software program of the system-on-chip, and supporting a handset access block, a wired/wireless network and an EIA232 access, wherein the JTAG access block connects the system-on-chip and the external debugging device through an input data signal, an output data signal, a data clock signal and a reset signal;
    a field programmable gate array (FPGA) for controlling the ARM core module and performing a control function for connecting the ARM core module and the peripheral interface; and
    the system-on-chip integrating the functions of the ARM core module and the FPGA.

17. The apparatus as recited in claim 16, wherein the ARM core module includes:
    an ARM core having a cache;
    a synchronizing block for synchronizing the clock and the data with the external debugging device through the peripheral interface;
    a clock generating block for providing the clock required in the ARM core function by using an inputted reference clock through the field programmable gate array;
    an embedded trace module for tracing the operating situation of the ARM core by being connected to an external trace port;
    an AHB coupling block for connecting to the external by binding a plurality of advanced host buses (AHB) and connecting the AHB to the outside; and
    a memory block for storing codes for an instruction and data.

18. The apparatus as recited in claim 16, wherein the system-on-chip includes:
    a core processor block for controlling the system-on-chip and performing a central processing;
    a user input/output block for controlling an external user access block; and
    a network access block for accessing to a wireless network.

19. The apparatus as recited in claim 18, wherein the core processor block includes:
    a risc core performing a central processing and having a processing capacity of 32 bits;
    an advanced host bus (AHB) decoder for decoding the access area of each controller connected to an advanced host bus (AHB);
    an advanced peripheral bus (APB) decoder for decoding the access area of each controller connected to the advanced peripheral bus (APB);
    a memory for temporarily storing a program and data to which the risc core can access fast;
    a real-time clock being connected to the APB for calculating minute, time, day, month and year, counting as a second unit according to the standard of the 1 Hz clock;
    a watch timer connected to the APB for generating an interrupt at a regular interval to watch the program performing procedure;
    a dual timer having two timers and connected to the APB for generating a timing signal at a time designated in the program based on the reference clock.

20. The apparatus as recited in claim 19, wherein the user input/output block includes:
- a universal asynchronous transceiver controller for controlling inputted/outputted data for the EIA232 communication and processing the data according to the universal asynchronous receiver transmitter (UART) protocol;
- a display device controller for controlling data and a clock signal for outputting information to an external display device;
- an input/output controller for processing a keypad data input signal and a light emitting diode drive signal; and
- a PCM/TDM controller for transmitting/receiving pulse code modulation (PCM) data with an external handset access block and time division multiplexing (TDM) data with an external device having a TDM bus interface, wherein the network access block includes:
- a wireless media access controller processing a media access control protocol for the wireless local area network (LAN) access; and
- a wireless physical processor connected to the wireless media access controller for performing an orthogonal frequency division multiplexing modem function.

* * * * *